United States Patent [19]

Dawans

[11] 4,107,134

[45] Aug. 15, 1978

[54] POLYBUTADIENE COMPOSITIONS CONTAINING REINFORCING GLASS MICROSPHERES AND CARBON FIBERS

[75] Inventor: François Dawans, Bougival, France

[73] Assignee: Institut Francais Du Petrole, Rueil-Malmaison, France

[21] Appl. No.: 736,348

[22] Filed: Oct. 27, 1976

[30] Foreign Application Priority Data

Oct. 31, 1975 [FR] France ............................ 75 33600

[51] Int. Cl.$^2$ .............................................. C08K 7/06
[52] U.S. Cl. ............................. 260/42.17; 260/42.18; 260/42.26; 260/42.28; 260/42.37; 521/54
[58] Field of Search ............... 260/42.37, 2.5 B, 42.17; 526/21

[56] References Cited

U.S. PATENT DOCUMENTS

| | | | |
|---|---|---|---|
| 3,849,350 | 11/1974 | Matsko | 260/2.5 B |
| 3,856,721 | 12/1974 | Fritschel | 260/42.37 |
| 4,020,054 | 4/1977 | Fodor | 260/42.37 |

FOREIGN PATENT DOCUMENTS 2,227,282 11/1974 France.

OTHER PUBLICATIONS

Modern Plastics Encyclopedia 1968 (McGraw-Hill), (N.Y.), (Sept. 1967), pp. 602–604.
Lee et al., – Handbook of Epoxy Resins, (McGraw-Hill), (N.Y.), (1967), pp. 3–15.

*Primary Examiner*—James H. Derrington
*Attorney, Agent, or Firm*—Millen & White

[57] ABSTRACT

An improved low density resin composition results from curing, in the presence of at least one free radical generator, a resin comprising:
- a. polybutadiene containing 50–80% of 1,2 units and having an average moleuclar weight by number lower than 100,000; and
- b. inorganic or organic hollow spheres included therein.

The resin composition preferably contain a fibrous reinforcing filler, preferably short carbon fibers.

8 Claims, No Drawings

POLYBUTADIENE COMPOSITIONS CONTAINING REINFORCING GLASS MICROSPHERES AND CARBON FIBERS

This invention concerns improved low density resins and their manufacture.

It is known that marine and sub-marine techniques require the use of materials having specific properties, particularly a low specific gravity, a high compressive strength, a low water absorption and a good resistance to hydrolysis.

Under the generic term "syntactic foam", it has already been proposed in the prior art, a certain number of materials consisting of polymeric resin compositions lightened by inclusion of hollow spheres.

It has now been discovered new syntactic foams of low specific gravity whose properties, particularly their compressive strength and low water absorption, make them convenient for long use at sea, even at great depth.

Generally, the low density resin compositions of the invention are obtained by curing a resin based on a polybutadiene of low molecular weight, in which are included inorganic or organic hollow spheres of convenient size, in the presence of at least one free radical generator.

Resins based on polybutadienes of low molecular weight as used according to the invention, consist, at least partly, of a polybutadiene containing from 50 to 80%, preferably from 60 to 75%, of 1,2 units and having a number average molecular weight lower than 100,000, preferably from 1,000 to 40,000. Such polybutadienes are well known in the art; they can be prepared according to conventional techniques, either by anionic catalysis in the presence of an alkali metal compound, or by coordination catalysis, for example in the presence of chromium or molybdenum derivatives.

The use, according to the invention, of polybutadienes whose micro/structure contains less than 80% of 1,2-units, provides for a better control of the exothermicity during the curing of the resin, and this is of particular importance when manufacturing articles of great size, for example floating members.

The hollow spheres which are included in the syntactic foams of the invention may be either inorganic or organic. By way of example, there can be mentioned the micro-spheres of borosilicate glass, silica, carbon, or thermoplastic or thermoset resins, whose diameter is generally from 10 to 500 microns, and the "macrospheres" of glass, or thermoplastic or thermoset resins, whose diameter is in most cases from 1 to 100 mm.

There can also be used hollow spheres of thermoplastic resins containing a volatile liquid, which may increase in volume during the curing of the foam.

The amount, the type and the size of the hollow spheres are determined in accordance with the properties desired for the syntactic foam. Generally, there is used from 5 to 50 parts by weight of hollow spheres per 100 parts by weight of resin. However, in order to obtain syntactic foams of high compressive strength, there is preferably used from 20 to 50 parts by weight of microspheres per 100 parts by weight of resin; preferably, the microspheres will have a relatively thick glass wall and will be of small size (for example, a diameter from 10 to 250 microns). On the contrary, when it is mainly desired to lighten the foams, and when the compressive strength is not critical, there will be added from 5 to 20 parts by weight of macrospheres having a diameter of for example from 1 to 20 mm.

In order to obtain a low specific gravity and/or a better accumulation of the spheres (filling factor), it may be advantageous to make use of a mixture of macro-and microspheres, or a mixture of microspheres with a binodal diameter distribution.

According to an advantageous feature of the invention, there can also be used hollow spheres in admixture with other reinforcing fillers, for example fibers such as glass fibers, or asbestos or even short carbon fibers, which have the advantage of improving the filling of the foam, of reducing the retraction of the foam during curing and of imparting thereto improved mechanical properties, particularly a higher compressive strength and a better shearing strength.

In this invention, the use of short carbon fibers is preferred in view of additional advantages resulting from their low specific gravity and their capacity of being conveniently admixed with the resin and the spheres, whereby it is possible to obtain a good distribution of the fiber filler within the final syntactic foam. Generally, there are used carbon fibers of a 0.25 to 10 mm length.

A particularly convenient composition of lightened resins of the invention comprises, for 100 parts by weight of resin, from 20 to 50 parts by weight of hollow glass micro-spheres having a diameter from 10 to 300 microns and an apparent specific gravity of 0.1 to 0.4, and from 1 to 10 parts by weight of carbon fibers.

In the following description, giving more operating details relating to the manufacture of low density resins such as above-defined, it should be understood that, at every passage in which the step of incorporating the hollow spheres is mentioned, the incorporation the reinforcing fiber filler as above defined, may also be contemplated, the inclusion of the fiber filler being performed either before or after that of the hollow spheres, or even simultaneously with the latter.

The hollow spheres may be directly incorporated into the polybutadiene when the latter is in liquid state, for example when its number average molecular weight, is lower than 5,000. However, in most cases, the hollow spheres are added to a solution of polybutadiene in one or more vinyl comonomers, liquid at room temperature and later on radically polymerizable and/or graftable, such for example as styrene, ethylstyrene, α-methylstyrene, tertiobutylstyrene, vinyltoluene, divinylbenzene, acrylonitrile and methacrylonitrile.

The comonomer content can be varied widely, particularly in relation with the viscosity of the solution of polybutadiene into which hollow spheres are incorporated. Generally, there can be used from 10 to 150 parts by weight of comonomer(s) per 100 parts of polybutadiene.

According to a particular embodiment of the invention, the polybutadiene is directly synthesized in solution in vinyl toluene according to the technique described in the French Patent No. 2,227,282. Under these conditions, the required amount of hollow spheres is added, at the beginning, to the solution of 1,3-butadiene in vinyltoluene; the inclusion of substantial amounts of spheres and their good distribution in the mass is facilitated, in this case, by the low viscosity of the medium. Subsequently, there is added under stirring successively the polymerization catalyst as described in the above-mentioned French patent, and then the free-radical generator, whereby it is possible finally to obtain directly a syntactic foam of excellent quality, optionally with a high sphere content, while considerably simplifying the way of performing the process, since by this way the preliminary steps of separating and dissolving the polybutadiene, as well as of admixing the spheres with a viscous liquid, are avoided.

According to another particular embodiment of the invention, particularly convenient for the manufacture of syntactic foams having a high content of hollow spheres, in order to obtain a minimum specific gravity, polybutadiene is dissolved in such a solvent as benzene, so as to obtain a solution whose fluidity makes possible an easy incorporation of a substantial amount of hollow spheres, for example, up to 50 parts by weight per 100 parts of resin. There is subsequently added the required amount of free-radical generator and, optionally, a hydrocarbon comonomer less volatile than the solvent, for example vinyltoluene or tertiobutyl/styrene. The mixture is then frozen at low temperature and the solvent is sublimated under reduced pressure, for example by lyophylization. The residual product may then be compressed in a mold and heated up to the decomposition temperature of the free-radical generator. By this way there is obtained a syntactic foam having a specific gravity lower than 0.5 g/cc, for example from 0.2 to 0.4 g/cc.

According to another particular embodiment of the invention, there is used a polybutadiene having groups improving the polymer adhesiveness to the hollow spheres. For example, when these spheres are made of glass, there will be used a polybutadiene previously subjected to partial epoxidation, for example of a proportion of 5 to 30% of its butadiene units, or even preferably, a polybutadiene previously subjected to the addition of a silane, for example to a proportion of 1 to 20% of its butadiene units. This addition results in another advantage of the foams of the invention, since, on the one hand, the fixation of a silane, for example trichlorosilane, is easily performed on the double bonds of polybutadiene, and improves the properties of adhesion of the polymer to glass, and, on the other hand, a good adhesion of the resin to the spheres is particularly desirable in order to prevent the propagation of microcrackings which may occur in the syntactic foam.

The free-radical generator is for example an organic peroxide compound; examples of such compounds are ditertiobutyl peroxide, benzoyl peroxide, lauroyl peroxide, tertiobutyl peracetate, dicumyl peroxide, 2,5-dimethyl/hexane 2,5-diperoxy benzoate, methylethylketone peroxide, 2,5-dimethyl 2,5 di-(tertiobutyl epoxy) hexane, ditertiobutyl diperoxyphthalate, tertiobutyl perbenzoate, di-(4-tertiobutyl-cyclohexyl) peroxydicarbonate, tertiobutyl peroxyisobutyrate, tertiobutyl peroctoate and dicyclohexyl peroxydicarbonate.

Suitable concentrations of free-radical generators are from 0.1 to 10 parts by weight per 100 parts of resin, these values being however not limitative. Such concentrations are particularly determined in relation with the size of the article made of the foam which is to be crosslinked; for example, in the case of articles of large size, there will be used preferably from 0.2 to 2 parts of free-radical generator per 100 parts of resin, while, in the case of smaller articles, higher concentrations will be used, which may be, for example, as high as 10 parts by weight per 100 parts by weight of resin.

Without departing from the scope of the invention, there can be used mixtures of free-radical generators, as well as their combination with compounds which speed up the crosslinking of the resin. Among these activating compounds, which are well-known in the art, there can be mentioned cobalt naphthenate, iron naphthenate, nickel octoate, cobalt acetylacetonate or a mixture of these compounds, optionally with an accelerator such as acetylacetone.

The temperature and time for curing the syntactic foams of the invention can be varied widely, particularly in relation with the type of the selected free-radical generator and with the composition of the resin. As a general rule, curing is conducted by heating the mixture at a temperature from 25° to 200° C, for 15 minutes to 20 hours.

It is possible, if desired, to conduct the heating of the resin in two steps, this providing for a better control of the reaction. This technique may be convenient for curing foam articles of big size. In a first step, curing is conducted at low temperature for example from 25° to 70° C, in the presence of a convenient free radical generating system, such as a peroxide which decomposes within this temperature range, or still a mixture of peroxide with cobalt and iron naphthenates and acetyl acetone.

By way of illustration of a system particularly convenient for curing the resin during the first step, there can be mentioned a mixture of methylethylketone peroxide, cobalt naphthenate, iron naphthenate and acetylacetone.

The second step of the curing is conducted in the presence of a peroxide which decomposes at a temperature higher than that used during the first step, for example at a temperature from 80° to 180° C. As examples of such compounds, there can be mentioned dicumyl peroxide, tertiobutyl perbenzoate and ditertiobutyl peroxide.

When the heat evolved during the first curing step is insufficient to produce the decomposition of the peroxide used in the second step, curing is then completed by heating the foam to the required temperature, for example in an oven.

Finally, it is possible, without departing from the scope of the invention, to add to the resins, before curing, various other conventional additives such, for example, as stabilizing agents or fire proofing agents, or even small amounts of comonomers improving the adhesiveness of the resin to the filler or its cross-linking degree, for example 1 to 5 parts by weight of comonomers per 100 parts by weight of resin. Among these comonomers, there can be mentioned vinylsilane, vinyltriacetoxysilane, vinyl tris 2-(methoxy ethoxy)silane, trimethylol/propane trimethacrylate or tris-allyl cyanurate.

The low density resins of the invention generally have the following properties:

an absorption of water (at 25° C for 24 hours-ASTM D 570) smaller than 0.2% by weight;

a low specific gravity, in most cases lower than 0.6 g/cc (ASTM D 792); and a compressive strength generally higher than 200 bars (ASTM D 695 and D 2736).

In most cases, the Rockwell hardness (ASTM D 785) is higher than about 70.

All these properties make them very advantageous, particularly for the manufacture of articles which have to withstand hydrostatic pressure compression, when submerged, such as submersibles or floats for great depths, or even diving suits.

The following examples illustrate the invention. They must not be considered in any way as limiting the same.

EXAMPLES 1 to 7

The characteristics of the polybutadiene used in these Examples 1 to 7 are given in Table 1 below.

TABLE 1

| Example No | Content of 1,2 units % | $\overline{M}_n$ (osmometry or tonometry) | Functionality of the polymer |
|---|---|---|---|
| 1 | 80 | 27 000 | nil |
| 2 | 80 | 27 000 | nil |
| 3 (a) | 75 | 4 100 | nil |
| 4 | 75 | 30 000 | 7% of lateral silane units |
| 5 | 70 | 3 400 | 12% of lateral epoxide units |
| 6 | 70 | 1 580 | nil |
| 7 | 65 | 18 200 | nil |

The compositions of the low density resins are reported in Table 2. The hollow spheres have been selected from those having a substantial compressive strength such as the "FT or EP Eccospheres" sold by Emerson and Cuming or the B-40-BX and B-30-B spheres sold by Minnesota Mining and Manufacturing Company.

Table 3 indicates the curing conditions and the properties of the obtained syntactic foams.

TABLE 2

| Example No | Composition in parts by weight | | | | | | |
|---|---|---|---|---|---|---|---|
| | 1 | 2 | 3 | 4 | 5 | 6 | 7 |
| Polybutadiene | 75 | 50 | 80 | 60 | 75 | 100 | 40 |
| Vinyltoluene | 25 | 50 | 20 | 40 | 25 | — | 60 |
| Hollow spheres | 20 | 40 | 40 | 45 | 40 | 35 | 33 |
| Trimethylolpropane trimethacrylate | 2.0 | 3.5 | 2.0 | — | — | 2.0 | 2.0 |
| Vinyl-tris(2 methoxy ethoxy) silane | 0.3 | 1.5 | 1.0 | — | — | 1.0 (a) | 1.0 (a) |
| Dicumyl peroxide at 95 % | — | 0.75 | — | — | 0.75 | 2.0 | 1.0 |
| Methylethylketone peroxide at 60 % | 1.0 | — | 2.0 | 0.5 | — | — | — |
| Cobalt naphthenate | 0.055 | — | 0.07 | 0.04 | — | — | — |
| Iron naphthenate | 0.015 | — | 0.02 | 0.015 | — | — | — |
| Acetylacetone | 0.2 | — | 0.4 | 0.1 | — | — | — |
| Tertiobutyl Perbenzoate | 0.8 | — | 0.8 | 0.75 | — | — | 1.0 |

(a) In each of these two examples the silane compound was vinylsilane instead of vinyl-tris (2 methoxy ethoxy) silane.

TABLE 3

| Example No | 1 | 2 | 3 | 4 | 5 | 6 | 7 |
|---|---|---|---|---|---|---|---|
| 1st curing step T° C | 50 | 150 | 50 | 40 | 130 | 130 | 120 |
| time (h) | 16 | 1 | 12 | 20 | 4 | 4 | 6 |
| 2nd curing step T° C | 140 | — | 140 | 140 | — | — | — |
| time (h) | 4 | — | 4 | 4 | — | — | — |
| specific gravity (g/cc) | 0.57 | 0.52 | 0.51 | 0.54 | 0.50 | 0.54 | 0.53 |
| compressive strength (bars) | 350 | 280 | 293 | 364 | 233 | 360 | 325 |
| water absorption (% by weight) | | | | | | | |
| at 25° C, 24 h | 0.14 | 0.06 | 0.11 | 0.05 | 0.16 | 0.05 | 0.09 |
| at 100° C, 24 h | 0.40 | 0.18 | 0.31 | 0.16 | 0.48 | 0.20 | 0.22 |

EXAMPLE 8

60 g of microspheres (sold under reference B-30-B) are admixed with a solution of 70 g of a polybutadiene having an average molecular weight by number of 3,400 and a content of 1,2 units of 70% and 1 g of tertiobutyl perbenzoate in 70 g of vinyltoluene. This mixture is poured into a mould and heated at 120° C for 6 hours. The temperature, measured at the center of the mixture, does not exceed 160° C during the curing step. By this way, there is obtained a foam having a specific gravity of about 0.55 g/cc, whose compressive strength is 345 bars and whose absorption of water, after having maintained the foam at ordinary temperature during one week under a water pressure of 250 bars, is smaller than 1.5%.

EXAMPLE 9

By way of comparison, Example 8 has been repeated but with the use of a polybutadiene whose content of 1,2 units is 92%, all other conditions being unchanged. In such a case, there is observed, during the curing step, an abrupt temperature increase, said temperature exceeding 200° C and, after curing, there is obtained a foam having several apparent cracks; the compressive strength is lower than 100 bars and the water absorption higher than 6%.

EXAMPLE 10

0.3 g of dicumyl peroxide is dissolved into 4 g of vinyltoluene and the solution is admixed with 16 g of a liquid polybutadiene containing 73% of 1,2 units and having an average molecular weight by number of 3,400. This solution is then added to a mixture of 15 grams of hollow spheres made of sodium borosilicate glass whose diameter is from 20 to 200 microns, with 5 grams of short carbon fibers of a length from 70 to 500 microns. The mixture is stirred at 60° C for one hour so as to obtain a good impregnation of the fillers; it is then poured into a mould, thoroughly degased so as to avoid the presence of air bubbles and, finally, it is heated successively at 90° C for 1 hour, at 110° C for 1 hour, at 130° C for 1 hour and at 150° C for 1 hour. After stripping from the mould there is obtained a hard article whose specific gravity is 0.7 g/cc, with a contraction, during curing, lower than 0.003 cm/cm.

EXAMPLE 11

To a solution of 45 g of a liquid polybutadiene (73% of 1,2 units, $\overline{M}_n = 3\,400$) in 125 g of vinyltoluene, containing 2.7 g of dicumyl peroxide, there is added successively 8g of short carbon fibers (length from 1 to 10 mm) and 60 g of glass microspheres (FTD 202 Emerson and Cuming). After curing the mixture in a mould at 150° C for 4 hours, there is obtained a syntactic foam having a specific gravity of 0.55 g/cc and whose resistance to hydrostatic pressure, measured according to standard ASTM D 2736, is 525 bars.

EXAMPLE 12

Example 11 is repeated, except that the carbon fibers are omitted, all other conditions being unchanged. The foam obtained in these conditions has a specific gravity of 0.52 g/cc and a compressive strength of 360 bars.

EXAMPLE 13

To a mixture containing 30 g of a liquid polybutadiene (70% of 1,2 units and $\overline{M}_n = 2,100$), 32 g of vinyltoluene, 2g of vinyltriethoxysilane, 4g of trimethylol-propane trimethacrylate, 0.5 g of tertiobutyl perbenzoate and 0.5 g of dicumyl peroxide, there is added 1.4 g of short carbon fibers and 30 g of glass microspheres (sold under reference B-30-B). The mixture is poured into a mould and progressively heated to 115° C for 1 hour, 130° C for 1 hour and 150° C for 2 further hours. The obtained syntactic foam has a specific gravity close to 0.5 and a compressive strength of 415 bars.

What I claim is:

1. A low density resin composition resulting from curing, in the presence of a sufficient cross-linking amount of at least one free-radical generator, a resin which comprises a polybutadiene containing from 50 to 80% of 1,2 units and having a number average molecular weight lower than 100,000, and at least one liquid vinyl monomer in a proportion of 0 – 150 parts by weight per 100 parts by weight of said polybutadiene, and incorporated in 100 parts by weight of said resin (a) 20–50 parts by weight glass hollow microspheres having a diameter of from 10 to 300 microns, and (b) 1–10 parts by weight of carbon fibers of a length of from 0.25 to 10 mm.

2. A composition according to claim 1, in which said polybutadiene contains from 60 to 75% of 1,2 units and has an average molecular weight by number from 1,000 to 40,000.

3. A composition according to claim 1, wherein said resin comprises at least one liquid vinyl monomer in a proportion from 10 to 150 parts by weight per 100 parts by weight of polybutadiene.

4. A composition according to claim 1, wherein said polybutadiene is partly epoxidized, in a proportion of 5 to 30% of its butadiene units.

5. A low density resin composition according to claim 1, wherein the resin is cured by heating at a temperature from 25° to 200 °C in the presence of the free-radical generator present in a proportion from 0.1 to 10% by weight with respect to the resin weight.

6. A composition according to claim 1, having a specific gravity lower than 0.6 g/cc, a compressive strength higher than 200 bars and a water absorption at 25° C for 24 hours lower than 0.2% by weight.

7. A shaped article withstanding compressive forces resulting from hydrostatic pressure produced by shaping the composition according to claim 1.

8. A composition according to claim 1, said polybutadiene having a silane connected thereto in a proportion of 1 to 20% of its butadiene units.

* * * * *